Jan. 27, 1970  W. BAKER  3,491,884
FILTER AND VALVE ASSEMBLY FOR WATER CIRCULATION SYSTEMS
Filed Dec. 2, 1966  3 Sheets-Sheet 1
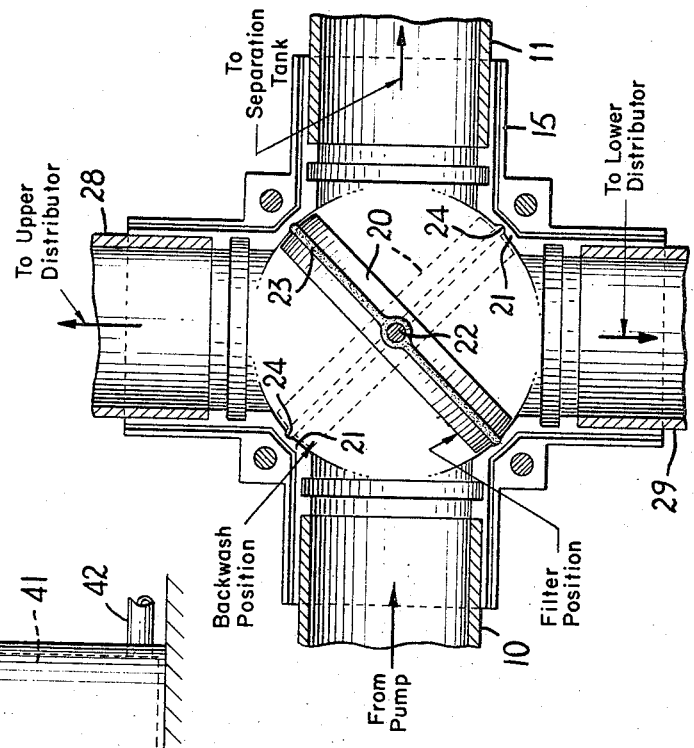
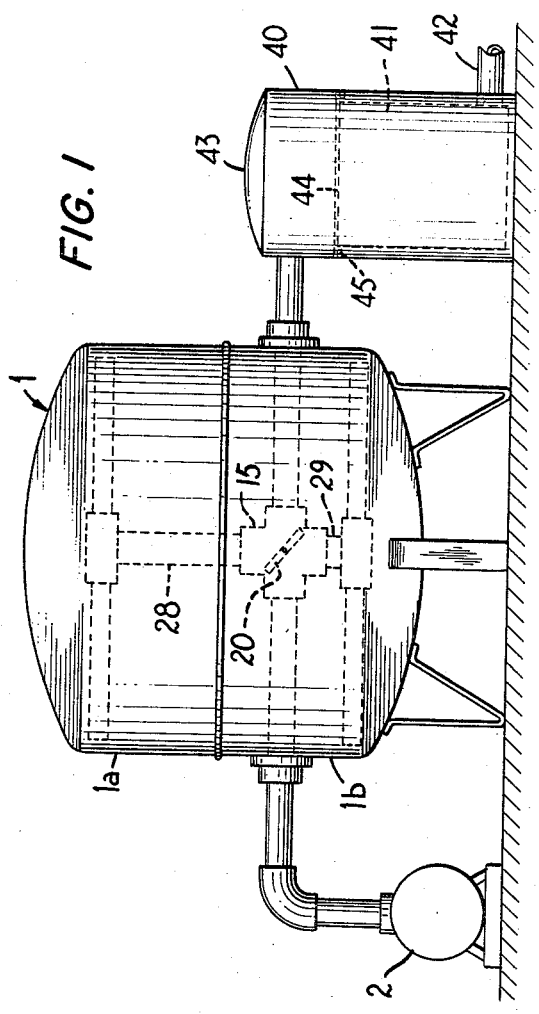
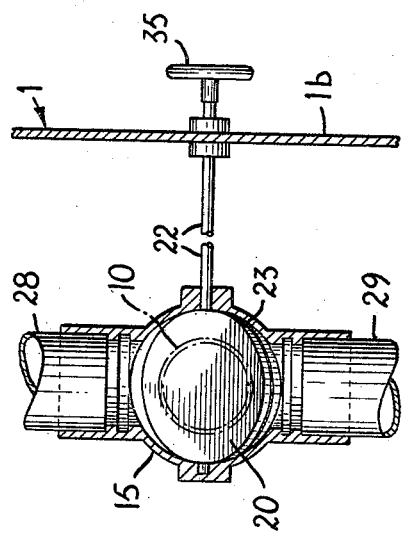

United States Patent Office 3,491,884
Patented Jan. 27, 1970

3,491,884
FILTER AND VALVE ASSEMBLY FOR WATER CIRCULATION SYSTEMS
William H. Baker, Albany, N.Y., assignor to Paddock of California, Inc., Albany, N.Y., a corporation of New York
Filed Dec. 2, 1966, Ser. No. 605,948
Int. Cl. E04h 3/20
U.S. Cl. 210—169        18 Claims

ABSTRACT OF THE DISCLOSURE

A filter and valve assembly for water circulation systems is provided having filtering and back-wash flow, fed from a unidirectional influent line to a filter tank and from the filter tank via a unidirection effluent line through a separator tank and back to the system. A four-way, two-position turn valve is disposed within the filter tank in the line of flow from the influent to the effluent. The valve can be set to either a filtering or backwashing position from the exterior of the tank, thereby reversing the flow within the filter bed. During the backwash cycle dirt that was captured by the filter is flushed out and retained by the separator.

---

This invention relates to a filter and valve assembly suited for use in a water circulation system and more particularly, to a swimming pool filter and valve combination adapted to control filtering and backwash flow by a single valve, through a single unidirectional influent connection and a single multipurpose unidirection effluent connection through the assembly.

In the operation of a swimming pool, it is desirable, due to the contamination of the swimming pool water, to circulate the water continuously or from time to time through a filter assembly. Sand filters as well as other types of filters have proved particularly useful for this purpose. In order to extend the life of the filter, a backwash flow of water through the filter is provided to remove the contaminants trapped therein. This backwash flow is then normally discharged as waste through a separate discharge line.

In order to control separate filter and backwash flow through the filter assembly, a plurality of valves, one for each line, are normally disposed adjacent to the filter tank and/or the pool.

It has also been conventional to control separate filter and backwash flow through the assembly by an externally disposed multiport valve connected to the filter assembly by appropriate piping. These are separately actuated, to open and close the lines, when changing from filtering to backwash, and vice versa.

U.S. Patent No. 3,278,034, dated Oct. 11, 1966, to West, describes a valve of the slide or plunger type, mounted within a filter tank and having connected thereto, within the tank, an inlet and two outlet lines, controlling flow between the two outlet lines. The valve structure is rather bulky, extending as it does the entire length of the tank, and expensive to fabricate and service, in view of its location and the location of the connecting lines within the tank. The provision of separate effluent lines for filtered water and waste wash water is also a continuance of a long-standing objection to this type of system.

In accordance with the instant invention, a filter and valve assembly is provided having filtering and backwash flow fed from a single preferably unidirectional influent line to a single preferably unidirectional effluent line, comprising, in combination, a filter tank adapted to receive a filter, such as a filter bed, and having an influent line and an effluent line both for delivery of filtered effluent and for discharge of backwash waste effluent; a turn valve assembly disposed in the line of flow from the influent to the effluent line and directing flow to the effluent line via the filter; the valve assembly comprising at least one turn valve movable at least between first and second positions; first and second fluid line connections, such as distributor-receivers, communicating with the valve assembly so as to receive fluid therefrom and deliver fluid thereto, according to the valve position; in one valve position the first line connection directing fluid through the filter in a direction to filter the fluid and the second line connection receiving filtered effluent, and in another valve position, the first line connection receiving backwash waste fluid, and the second line connection directing fluid through the filter to backwash the filter; and means operatively connected to the valve to move it between the first and second positions, such that in the first position, the first fluid line connection communicates with the influent line and the effluent line is opened to filtrate flow from the filter, and in the second position, the second fluid line connection communicates with the influent line, and the effluent line is opened to backwash flow from the filter.

This invention further provides a filter assembly having a filtering and backwash flow, fed from a single influent line to a single effluent line, comprising, in combination, a filter tank adapted to receive a filter and having an influent line and an effluent line for delivery of filtered effluent and backwash waste effluent; a turn valve assembly disposed in the line of flow from the influent to the effluent line and directing flow to the effluent line via the filter; and first and second fluid distributor-receivers communicating with the valve assembly so as to receive fluid therefrom and deliver fluid thereto, according to the valve position; in one valve position the first distributor directing fluid through the filter in one direction to filter the fluid and the second distributor receiving filtered effluent, and in a second valve position the first distributor receiving backwash waste fluid and the second distributor directing fluid through the filter to backwash the filter; the distributors being disposed across the filter surface with at least a substantial portion of the filter disposed therebetween, and formed in a configuration corresponding to the surface configuration of the filter to evenly distribute fluid across the surface of the filter.

In a further embodiment of the invention, a saparation tank is provided in series with the filter tank, to receive and process backwash waste effluent. The separation tank can include a removable separator or filter, such as a filter receptacle, to collect suspended material from such effluent, and so dispose of waste material washed off the filter during backwash. Preferably, the separation tank is so arranged that all effluent from the filter tank must pass through the separation tank.

The invention is of special application to purifying water for use in swimming pools, and the combination of the valve and filter tank with a separation tank is preferred.

The drawings illustrate a preferred embodiment of the valve filter assembly.

FIGURE 1 is a side view of a filter and valve assembly, with the valve in position for backwashing.

FIGURE 2 is a detailed side view of the turn valve of FIGURE 1, with the valve in position for filtering, and showing in dashed lines the position of the valve for backwashing.

FIGURE 3 is an enlarged cross-sectional view of the valve control system for the turn valve.

Figure 4:
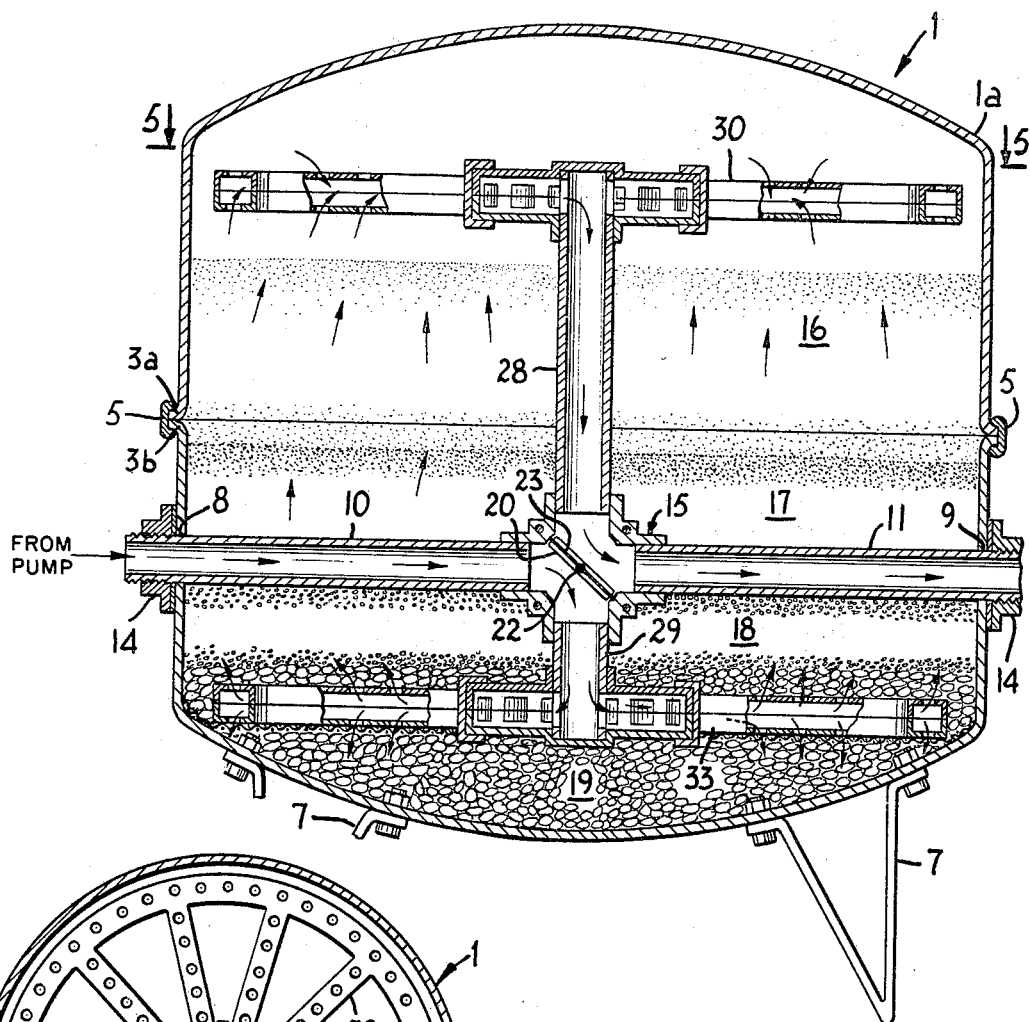
FIGURE 4 is a cross-sectional view of the filter and valve assembly shown in FIGURE 1.

In the preferred embodiment of valve assembly, the valve takes the form of a turn or flip-flop valve having at least one valve member and disposed in a valve housing across a four-way junction of influent, effluent and connection lines to and from the filter. The valve is arranged so that all flow between the influent and effluent lines must pass through the filter. The valve member is preferably in the form of a disk or plate rotatably carried on a shaft in the housing, and which seals against the housing sides or at valve seats.

The valve housing in a preferred embodiment comprises a chamber having at least four passages opening into it in pairs disposed at opposite sides. The valve member then is mounted to bisect the chamber, and connect the four passages in two combinations of adjacent pairs, the influent line being connected, in alternate sequence, to each of the line connections, and the effluent line likewise being connected to the other of each of the line connections, in alternate sequence. The filter is in the line of flow between the two line connections, with the result that according to the valve position the flow is unidirectional in the influent and effluent lines, but is reversible through the filter, for backwash and filtration purposes.

The valve member, such as a disk or plate, can be provided with an O-ring at its outer periphery, and is dimensioned to tightly engage the walls or valve seat of the valve housing, and seal thereagainst in a relatively fluid-tight seal. The valve member can be rotated in the same direction 90° to each position, or flipped from side to side between the two positions of the valve, alternately connecting the influent and effluent lines with one each of the distributor lines. Other valve structures can be used instead of a turn valve. For example, a pivoted butterfly valve could be used.

If a valve mounted on a 360°-rotatable shaft is used, stop members can be provided to hold the valve in each position, or to limit the travel of the shaft within the valve housing to a flip-flop valve. The stop members can be formed as flanges, pins, lugs, recesses or slots in the valve seats, or the like.

Normally, the shaft is provided with a handle which is disposed at one end of the shaft and extends outside the tank. This handle can be made to rotate around or flip back and forth between 90° positions on a dial, showing the position of the valve.

In the preferred embodiment of valve assembly, flow is directed in sequence to each side of the filter by flow distributor-receivers. These distributors are formed to distribute fluid relatively uniformly across the surface of the filter. If the filter is circular in cross-section, the distributor can take the form of a spoked wheel having a plurality of apertures distributed over its surfaces. The distributors will be disposed on arms with the valve housing at its hub, and communicate with the valve housing through one or more connecting openings. Other configurations and dispositions of the distributor are also possible, including a star-like configuration, a hollow disk configuration, a plurality of arms and the like. All of these will be formed with a plurality of apertures distributed over their surface for the passage of fluid therethrough.

In the case of a filter bed, there can be a first distributor disposed at one end of the filter bed and a second distributor at the other end of the bed. The latter distributor can be disposed within the filter bed.

It is also possible to form the distributors of a screen or mesh supported on a base, and enclosing a hollow interior, connected to one of the line connections. This construction also lends itself to the configurations enumerated above.

The apertures should be of a size to prevent the entry of particles carried by filtered water into the system. If they are larger than the sand or rock particles, they can be provided with a mesh filter screen to hold the sand or rock in the tank. The distributors can be dimensioned such that they uniformly distribute fluid to all portions of the bed, and thus provide uniform flow through the bed, and uniform filtration of the fluid. This will prolong the life of the filter bed, and improve the efficiency of filtration of the fluid, by preventing channeling.

The filter tank is formed to accommodate the filter and valve assembly. In the drawings, it is shown as a generally cylindrical housing which is filled with a bed of filter material. The tank, however, can also be formed in a rectangular shape, or any other configuration which is desired, depending upon the size and type of filter that is used.

The tank can be formed with a removable lid, or in two sectional portions which can readily be separated for cleaning, and which can hold a filter element or a bed of filter material. The juncture of the two sections of the tank can be formed by providing mating flanges on each of the two sections of the tank. Such flanges can be clamped together in a relatively fluid-tight seal quite easily and means for clamping such flanges together are well known. The two tank sections can be equal or unequal in height. If the tank sections are of equal height, mass production of the assembly is facilitated, since these sections can be virtually identical to each other and require only minor modification to be made into either top or bottom sections. The tank however need not be formed of two sections, but could be made of a single unit.

The filter and valve can be put anywhere in the tank, and the tank can be upright or on its side. The charging of the tank with a filter or with particulate filter material can be facilitated by providing a door or opening in the tank. The influent and effluent lines can be anywhere in the tank, also, and so can the valve, inasmuch as a pumped fluid circulation system is usually provided. Gravity flow through the filters can be provided for, if desired, by a vertical arrangement of the filters and effluent lines.

The tank can be formed of steel, stainless steel, aluminum, copper, brass and the like, or of plastic materials, such as polytetrafluoroethylene, polypropylene, polyethylene, polystyrene, and polycarbonate resins.

A suitable filter is a screen or mesh filter which can be coated, if desired, with a layer of diatomaceous earth. Such screens can be disposed in the tank by filter supports and the composite can be shaped to comprise a fluid distributor having a disk-like configuration.

Flat filter meshes and screen can also be used, alone, or interposed among and between the layers of a filter bed to provide added filtration and layer separation. A relatively coarse screen which is adapted to be readily removed or easily reached for cleaning can be provided above the topmost layer, to remove gross size contaminants, such as leaves, twigs, bugs, and the like, which may enter the water circulating system. Fibrous filter media are also suitable.

A filter bed for swimming pool circulation systems can be composed of said and/or rock of the same grade, or composed of layers of sand and/or rock of several grades. These can be disposed in layers of increasing coarseness from top to bottom within the tank. The layers can comprise a topmost layer of No. 20 sand. This layer will preferably be the thickest and can be approximately one-half of the filter bed. A second layer of No. 12 sand can be disposed directly beneath the layer of No. 20 sand. This layer will preferably be of substantially less thickness than the preceding layer. The next layer can be a layer of rock of ⅛ to ¼ inch in diameter. This layer will be approximately equal in thickness to the preceding layer. The lowermost and coarsest layer can be composed of ¼ to ½ inch rock. This will fill the remainder of the tank. It is also possible in such a filter assembly to employ a bed composed of a single layer of one grade of sand. Materials such as charcoal can be included and the particular thickness, position or coarseness of a particular layer will be selected with reference to the requirements of the system to which this filter assembly is connected.

In general, any type of filter can be used. The choice of filter medium will depend upon the filter circulating system.

The influent and effluent lines and connections can be formed from available pipe and plumbing fixtures. In the preferred valve assembly, the valve housing comprises a spherical housing having an array of four opposed connections, two connections on opposite sides forming the influent and effluent line connections, and two connections on opposite sides forming the filter line connections.

The filter and valve assembly shown in the drawings both filters fluid and reversibly backwashes the filter bed, reversing flow through the filter, using fluid flowing in the same direction from the same influent line to the same effluent line. Only one movement of the valve opens or closes all interconnecting passages for the purpose of reversing flow through the filter. The entire assembly is enclosed in the tank, so no unsightly valve structure is exposed in the instant invention. Maintenance of the instant assembly is simple, due to its few moving parts.

The filter assembly shown in FIGURES 1 to 5 has the valve assembly in the position shown in FIGURES 1 and 4 for backwashing, and in the position shown in FIGURE 2 to filter fluid, in both cases delivering it through an effluent line to, for instance, a swimming pool (not shown). This assembly comprises a generally cylindrical tank 1 made of stainless steel. The tank has upper and lower sections 1a and 1b, respectively. Each section is provided with mating flanges 3a and 3b, and the flanges are engaged by a locking clamp 5 which holds the tank sections together. The tank is also provided with a plurality of legs 7 fixed to the lower section thereof. The tank section 1b is formed with side apertures 8 and 9, respectively, at opposite sides of the tank 1.

The valve housing 15 is disposed at the center of the tank, and to its ends are attached influent line 10 and effluent line 11. Line 10 runs from pump 2 vertically and then horizontally into the section 1b of the tank at aperture 8, and is inserted in the valve housing 15. The effluent line 11 is also inserted at its inner end in valve housing 15, and runs to a separation tank 40, which for illustration is connected to a pool circulation system and circulates filtered water to the pool from the tank 1.

A relatively fluid-tight seal of the pipes 10, 11 extending through the tank 1 is provided by lock nuts 14 which engage each line and seal against the tank.

The tank contains a filter bed which is composed of a plurality of grades of sand and rock. These are disposed in layers of increasing coarseness from top to bottom. The first layer 16 is composed of No. 20 sand. The second layer 17 is relatively thin compared to the first and is composed of No. 12 sand. The third layer 18 is of approximately the same thickness of the second and is composed of ⅛ to ¼ inch rock. The bottom layer 19 fills the remainder of the tank and is composed of ¼ to ½ inch rock.

Within the valve housing 15 is a turn or flip-flop valve plate 20, best seen in FIGURE 2, whose sides engage curved valve seats 21 at each line junction. The valve 20 rotates on shaft 22 between the position shown and that shown in dashed lines.

The valve disk 20 is provided at its outer periphery with an O ring 23, which engages the wall of the valve housing 15 in a relatively fluid-tight seal. The position shown is fixed by slots 24, which receive the O ring 23 in a snug fit, in each position of the valve, and serve as a stop to prevent the valve from rotating further until the O ring is forced out of the slot.

Shaft 22 has a handle 35 at the far end thereof, outside the tank wall. Rotation of the shaft flips the valve within the valve housing pipe 15 to its right or left position, and different flow paths within the valve assembly are exposed when the plunger is in the right hand position, in solid lines in FIGURE 2, or in the left hand position, in phantom lines in FIGURE 2, and shown in full lines in FIGURE 4.

The travel of the valve disk 20 between these positions can be limited in each position by engagement of a stop member so that the valve is a flip-flop valve.

Two fluid distributor-receivers, an upper 30, and a lower 33, are horizontally disposed within the filter tank, and communicate with the top and bottom, respectively, of the valve housing via lines 28 and 29. The upper distributor-receiver 30 is disposed above the filter bed, and the lower distributor-receiver 33 is disposed in the lowermost layer 19 of the bed.

Figure 5:
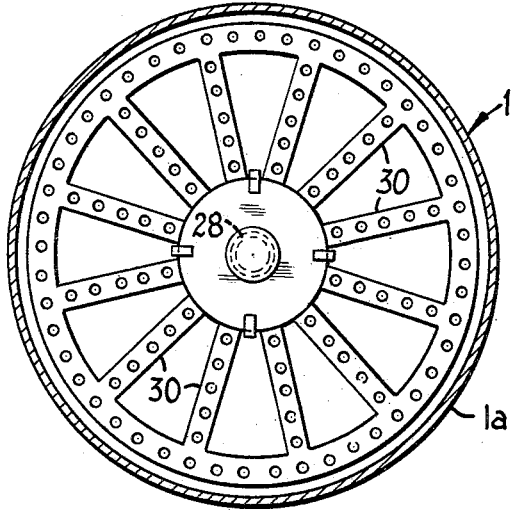
FIGURE 5 is a top view of a distributor-receiver of the filter and valve assembly of FIGURE 1.

The distributor-receivers are in the form of spoked wheels, best seen in FIGURE 5, which communicate with the valve housing pipe 15 at their hub. The periphery of the wheel and the spokes are provided with a plurality of apertures for the passage of water therethrough. The wheel configuration of the distributors, extending as it does across the entire surface of the bed, provides uniform distribution of fluid throughout the filter bed, and prevents channeling of fluid through particular areas of the filter bed. The lower distributor can be provided with a wire screen mesh disposed across the apertures to prevent the passage of sand into the system. The distributors as shown have a diameter just short of the filter tank, but of course they can be considerably smaller. The lower distributor is not essential and can be omitted, or replaced, if desired, with wire mesh covers for the openings in line 29.

Effluent line 11 leads to the top of a separation tank 40. The separation tank is provided to clean up backwash waste effluent from the filter tank, and for this purpose contains a filter bag 41 removably fitted in the tank across the line of flow from the top to the bottom of the tank. The bag has a ring 44 at the top, that is supported on ledge 45 in the tank wall, for easy replacement of the bag. It is held in place by water flow in the downward direction. A filter can also be used that is capable of further cleaning up filtrate flow, so that a second effective filter stage is provided by the separation filter when the system is on the filtering cycle. At the bottom of one side of the separator tank is a drain line 42, leading to the use facility for filtered water from the tank, say, for illustration, to a swimming pool. If desired, a bypass line running between lines 11 and 42 can be provided, to cut the separator tank out of the circuit except when backwash effluent is being discharged through line 11. Access to the bag 41 is provided by making the top 43 of the tank removable.

When the valve assembly is in the filtering position (shown in FIGURE 2), the influent line 10 is in communication with top distributor line 28, and the lower distributor line 29 communicates with the effluent line 11. In this position, as shown, fluid passes from the influent line 10 into the housing 15 where it is diverted by the valve 20 into the line 28 to the upper distributor 30. Fluid flows through the distributor 30 onto the filter bed, and is filtered by passing downwardly through the bed. Thence, it passes into the lower distributor 33, now acting as a receiver, and then through the line 29 to housing 15, where it is diverted by the other side of valve 20 into filtrate effluent line 11 to the separation tank 40, and then via bag 41 and line 42 to the swimming pool.

When filtration is no longer practical, the filter is cleaned by backwashing. The valve handle 35 is rotated 90° to the right or left, and the valve 20 is thus flipped to backwash flow position shown in phantom lines in FIGURE 2, and in FIGURE 4. In this position, the valve communicates influent line 10 with line 29 to the lower distributor 33, and closes off flow from the inlet to the upper distributor 30. The upper distributor 30 is put in communication with the effluent line 11. Fluid now passes in the reverse direction through the filter bed, first downwardly through line 29 to the lower distributor 33, and thence upwardly through the filter bed, and so backwashes it. This backwash flow then passes into the upper distributor 30, now acting as a receiver, downwardly through line 28 to the valve housing 15, where it is diverted by valve 20 through the effluent line 11 to the separation tank 40. Debris and other suspended matter si removed in filter 41, and the water then passes to the drain line 42 to the pool.

It will be noted that the flow through the influent line and effluent line is in the same direction, even though flow through the filter bed has been reversed.

When the filter is clean, it can be simply put onstream for filtering by returning the valve 20 to the position shown in FIGURE 2. When the bag 41 is full, it can be lifted out of tank 40 and a clean bag inserted, after removing the lid 43. The separation tank can be operated with the valve in filtering position, without the bag in place.

Figure 6:
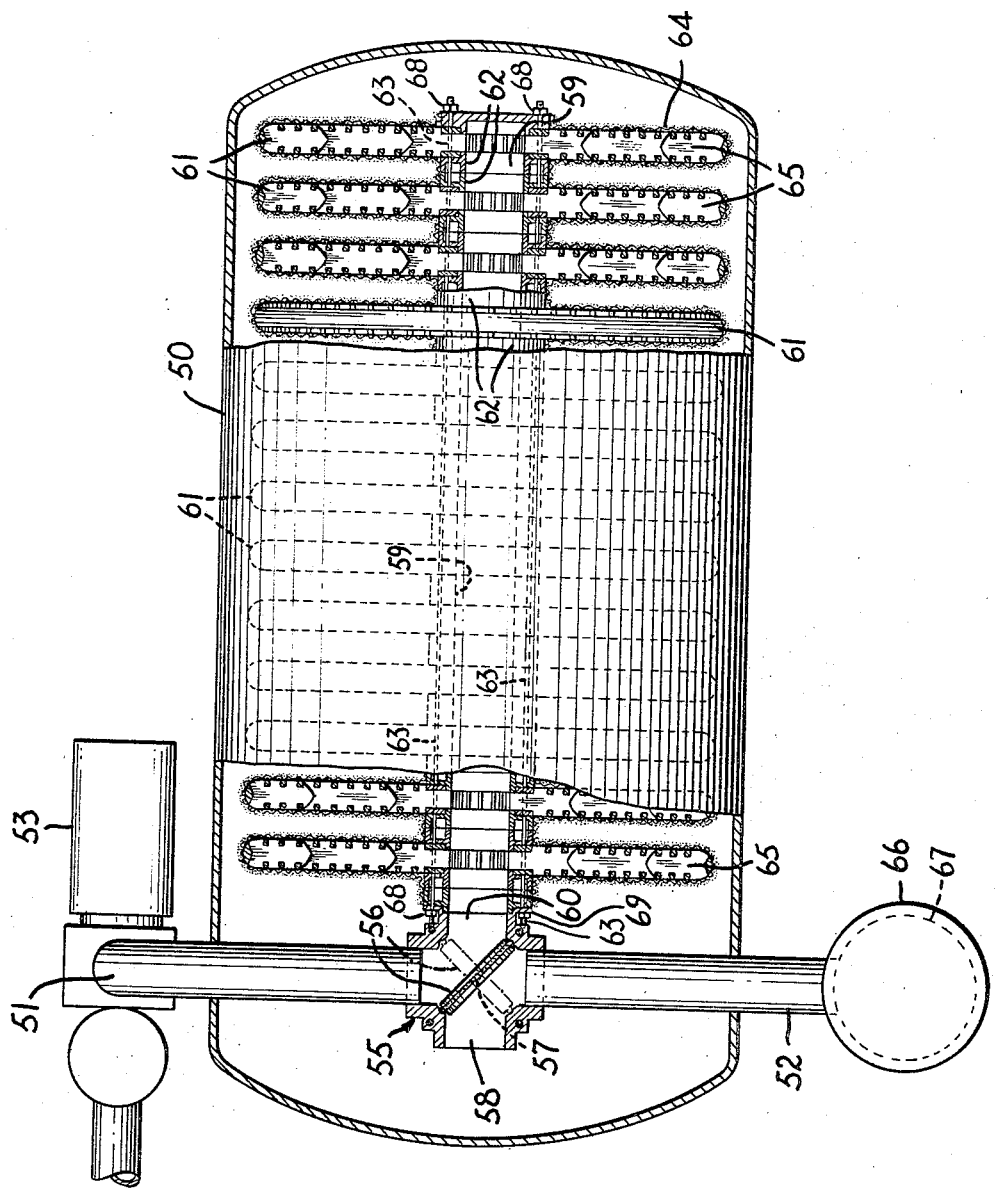
FIGURE 6 is a side view in section of a further embodiment of a filter and valve assembly in accordance with the invention, employing a plurality of filters.

The filter tank and valve assembly shown in FIGURE 6 comprises a filter tank 50 having an influent pipe connection 51 and an effluent pipe connection 52. A pump and motor 53 supplies the liquid into the influent line 51, such as, for instance, water from the source of supply or from a swimming pool. Situated at one end of the tank is a valve housing 55 in which is disposed a plate valve 56 rotatably mounted on a shaft 57. The valve plate reciprocates between the positions shown in solid lines and in the dashed lines in FIGURE 2. The position shown in the solid lines is for backwash, and in the phantom lines is for filtration.

Also leading into the valve housing are an opening 58, opening directly into the interior of the tank 50, and a tubular passage 59 extending sidewise from opening 60, the entire length of the tank. Opening 58, and passage 59 and opening 60 serve as distributor-receivers for the fluid passing through the filter in either direction to and from the valve housing 55.

An array of filter distributors 61, two faced porous discs, the space 65 between which opens directly into their open centers, and separated by spacers 62, with open centers, are mounted on and held together by four stainless steel rods 63. The rods extend from end to end of the array, and are attached at one end to the flange 69 on valve housing 55. Nuts 68 at each end of the rods permit a secure leakproof assembly of the array. The open centers of the distributors 61 and spacers 62 constitute in combination a line or passage 59 leading from the valve housing opening 60, and through which passes the fluid from or to the distributors. The surfaces of the discs are coated with a layer of diatomaceous earth 64.

Thus, all fluid passing into or out from the tank must pass through the valve housing 55, where its flow can be directed in one direction or the other through the filters 61 by the valve plate 56.

Effluent line 52 leads to a separation tank 66, which is provided with a filter bag 67 and is otherwise similar to the tank and filter assembly shown in FIGURE 1. Consequently, reference should be made to this figure for further details of the construction. The separator tank and filter assembly is in series from the filter tank to the source of use in the fluid, for example, a swimming pool.

In operation, the valve is placed in the position shown in solid lines in FIGURE 6 for control of backwash flow. Fluid for backwashing is pumped by the pump 53 into the line 51, where it enters the valve housing 55, and is directed by the valve plate 56 into passage 59. It then flows into the open interior 65 of the filters 61, emerging through the filters in a backwash action that lifts debris and other contaminant material on the surface of the filters, and flows into the interior of the tank 50, to the opening 58 in the valve housing, which it enters, and is directed by the valve plate 56 into effluent line 52. The backwash effluent flow then passes into the separation tank 66, where the suspended material is removed by the filter.

After the filters have been washed clean, the valve 56 is rotated 90° to the right, entering the position shown in the phantom lines in FIGURE 6. In this position, fluid entering via effluent line 51 is directed by the valve plate 56 out of the opening 58 of the valve housing 55 into the interior of the tank 50. It then enters the filters 51, passing through the diatomaceous earth layer 64 into the interior 65 of the filters, whence it enters the passage 59 and then passes via opening 60 into the valve housing 55. There, it is directed by the other side of the valve plate 56 into the effluent line 52, whence it passes through the separation tank 66 and filters 67, and then proceeds to the source of use, in this case a swimming pool.

Although a manually operated valve is shown in the drawings, the valve control can readily be adapted to automatic operation by an electric motor, an electromagnetic control, or a pneumatic device. Automatic timers can also be attached, as will be apparent to those skilled in the art, for timed cyclic operation. While the device is especially suited for control of flow to both sides of a filter, alternately, it can be adapted to control flow of different receiving lines or to one side, alternately, of any type of device or system. It can, for instance, be used to control flow to a single bed dryer, for a drying cycle and a regeneration cycle, from opposite sides of a bed, alternately. Other applications will be evident to those skilled in this art. However, the filter and tank assembly is of especial application to recirculating filters in swimming pools.

Having regard to the foregoing disclosure, the following is claimed as the inventive and patentable embodiments thereof.

1. A filter assembly in which fluid flow for both filtering and backwash cycles is fed from one influent line to one effluent line, and adapted to maintain continuous unidirectional flow through the influent and effluent lines while on either the filtering or backwash cycle, comprising, in combination, a filter tank adapted to receive a filter, and having within the tank only one influent line for receiving only unfiltered fluid and only one effluent line for delivery of both filtered effluent and backwash waste effluent from the filter tank; a valve assembly disposed wholly within the filter tank in the line of fluid flow from the influence to the effluent line and directing flow from the influence line to the effluent line via the filter during both the filtering and backwash cycles; the valve assembly comprising a valve housing and a valve movable between first and second positions, and means operatively connected from the exterior of the filter tank to the interior valve, to move it between the first and second positions; first and second fluid line connections communicating opposite sides of the filter with the valve assembly, so as to reversibly receive fluid therefrom or deliver fluid thereto, and to deliver fluid thereto or receive fluid therefrom, respectively, according to the valve position, while maintaining fluid flow in a single direction through the influent and effluent line in each valve position; in the first valve position, the first line connection directing fluid from the influent line from one side through the filter to clean the fluid, and the second line connection receiving filtered fluid and directing it to the effluent line, and in the second valve position, the first line connection receiving backwash waste fluid and directing it to the effluent line, and the second line connection directing fluid from the influent line to the other side through the filter to backwash the filter; a separator tank and a separator therein in communication with the effluent line.

2. A filter assembly in accordance with claim 1, in which the separator is a filter that is removably mounted in the separator tank.

3. A filter assembly in accordance with claim 1, in which the valve housing has two opposed pairs of openings, one opposed pair in communication with the influent and effluent lines, and one opposed pair in communication with the fluid line connections, and the valve reverses the flow in each fluid line connection in each successive position.

4. A filter assembly in accordance with claim 1, in which the fluid line connections run to fluid distributor-receivers, for the uniform flow distribution of the fluid across the surface of the filter.

5. A filter assembly in accordance with claim 4, in which the fluid distributor-receivers comprise a plurality of filter supports having a mesh filter disposed thereon.

6. A filter assembly in accordance with claim 5, in which the mesh filter retains a layer of diatomaceous earth thereon.

7. A filter assembly in accordance with claim 1, in which the filter tank comprises as the filter a filter bed composed at least in part of sand.

8. A filter assembly in accordance with claim 1, in which the valve is a four-way flip-flop valve rotatable between two valve positions.

9. A filter assembly in accordance with claim 1, in which the valve has four lines entering into a common chamber, and the valve is placed across the chamber in a manner to connect only alternate pairs of the four lines.

10. A filter assembly in which fluid flow for both filtering and backwash cycles is fed from a single influent line to a single effluent line, and adapted to maintain continuous unidirectional flow through the influent and effluent lines while on either the filtering or backwash cycle, comprising, in combination, a filter tank having therein a single influent line for receiving only unfiltered fluid; a single effluent line in line with the influent line along the same center line for delivering both filtered fluid and backwash waste effluent; a filter in the line of flow between the influent and effluent lines so that all flow therebetween passes through the filter; a four-way valve carried on a shaft within a valve housing rotatably movable between two positions and wholly disposed within the tank in the line of flow from the influent to the effluent line, and continuously directing flow from the influent line to the effluent line via the filter; means attached to the shaft to rotate the valve between the two positions from the exterior of the filter tank; and first and second fluid distributor-receivers each extending in a plane across the tank and respectively communicating each side of the filter with the four-way valve, so as to receive fluid therefrom and deliver fluid thereto according to the valve position, while maintaining fluid flow in a single direction through the influent and effluent lines in each valve position; the first distributor-receiver directing fluid from the influent line to one side of the filter in the first valve position to clean the fluid and receiving backwash waste fluid from the filter and directing it to the effluent line in the second valve position, and the second distributor-receiver receiving filtered fluid from the filter and directing it to the effluent line in the first valve position and directing fluid from the influent line to the other side of the filter to backwash the filter in the second valve position, the distributor-receivers being in the form of hollow spoked wheels which communicate with the valve housing at their centers, said distributor-receivers having a plurality of apertures evenly spaced along their outer periphery and along the spokes for the uniform distribution of unfiltered fluid from the influent line across the surface of the filter, and the uniform receipt of filtered fluid or backwash waste fluid from the filter.

11. A swimming pool filter assembly adapted to be used in a swimming pool water circulation system and capable of maintaining a continuous circulating flow during both filtering and backwash cycles, and fed by unidirectional flow from the swimming pool in one influent line, and returned to the swimming pool via one effluent line, comprising, in combination, a filter tank having only one influent line for receiving unifiltered water from the swimming pool and only one effluent line for delivery of both unfiltered water and backwash effluent; a filter disposed in the filter tank in the line of flow between the influent and effluent lines, so that all flow therebetween passes through the filter to clean the water or to backwash the filter; a separator tank and a filter therein, in the effluent line leading from the filter tank to the swimming pool to remove waste products from the backwash effluent and prevent contamination of the swimming pool during backwash cycle flow to the pool; a valve assembly disposed in the filter tank in the line of flow from the influent to the effluent line and directing all flow from the influent line to the effluent line via the filter; the valve assembly comprising a valve housing in the tank, a turn valve disposed within the valve housing and rotatably movable between first and second positions; and means exteriorly of the tank to move the valve between such positions; first and second fluid line connections communicating with the valve housing and with opposite sides, respectively, of the filter, and disposed within the housing; the valve in the first position connecting the first fluid line connection with the influent line and the second fluid line connection with the effluent line, and the valve in the second position connecting the second fluid line connection with the influent line and the first fluid line connection with the effluent line, thus reversing the flow through the fluid line connections in each sequential position while maintaining unidirectional flow through the circulation system via the influent and effluent lines in the first and second positions of the valve.

12. A swimming pool filter assembly in accordance with claim 11, in which the valve housing has opposed influent and effluent openings and opposed line connection openings, all opening into a common chamber, with the valve diagonally disposed across the chamber in a manner to connect, in separate sequence, the influent line opening with the first and second line connection openings, and the effluent line opening with the second and first line connection openings.

13. A circulating swimming pool water filtration system comprising, in combination, in operative connection, a swimming pool and a filter assembly in accordance with claim 1.

14. A circulating swimming pool water filtration system comprising, in combination, in operative connection, a swimming pool and a filter assembly in accordance with claim 10.

15. A circulating swimming pool water filtration system comprising, in combination, in operative connection, a swimming pool and a swimming pool filter assembly in accordance with claim 11.

16. A filter assembly in accordance with claim 10, in which the four-way valve comprises a valve housing having a chamber with four passages opening into it in pairs disposed at opposite sides; and a valve disk movable about its diameter between two positions to bisect the chamber and connect the four passages in two combinations of adjacent pairs.

17. A swimming pool filter assembly in accordance with claim 11, in which the influent and effluent lines are in line with one another, along the same centerline.

18. A circulating swimming pool water filtration system, comprising, in combination, in operative connection, a swimming pool and a swimming pool filter assembly in which fluid flow for both filtering and backwash cycles is fed from one influent line to one effluent line, and adapted to maintain continuous unidirectional flow through the influent and effluent lines while on either the filtering or backwash cycle, comprising, in combination, a filter tank adapted to receive a filter, and having within the tank only one influent line for receiving only unfiltered fluid and only one effluent line for delivery of both filtered effluent and backwash waste effluent from the filter tank; a valve assembly disposed wholly within the filter tank in the line of fluid flow from the influent to the effluent line and directing flow from the influent line to the effluent line via the filter during both the filtering and backwash cycles; the valve assembly comprising a valve housing and a valve movable between first and second positions, and means operatively connected from the exterior of the filter tank to the interior valve, to move it between the first and second positions; first and second fluid line connections communicating opposite sides of the filter with the valve assembly, so as to reversibly receive fluid therefrom or deliver fluid thereto, and to deliver fluid thereto or receive fluid therefrom, respectively, according to the valve position, while maintaining fluid flow in a single direction through the influent and effluent lines in each valve position; in the first valve position, the first line connection directing fluid from the influent line from one side through the filter to clean the fluid, and the second line connection receiving filtered fluid and directing it to the effluent line, and in the second valve position, the first line connection receiving backwash waste fluid and directing it to the effluent line, and the second line connection directing fluid from the influent line to the other side through the filter to backwash the filter; the valve housing having two opposed pairs of openings, one opposed pair in communication with the influent and effluent lines, and one opposed pair in communication with the fluid line connections, so that the valve has four lines entering into a common chamber, and the valve is a four-way flip-flop valve rotatable between two valve positions and is placed across the chamber in a manner to connect only alternate pairs of the four lines so that the valve reverses the flow in each fluid line connection in each successive position, the swimming pool and the swimming pool filter assembly being in continuous flow connection in each position of the valve.

References Cited

UNITED STATES PATENTS

| | | | |
|---|---|---|---|
| 3,149,070 | 9/1964 | Nash | 210—169 |
| 3,184,111 | 5/1965 | Watson et al. | 210—169 |
| 3,276,588 | 10/1966 | Nehrbass et al. | 210—169 |
| 3,365,064 | 1/1968 | Horan | 210—169 |

REUBEN FRIEDMAN, Primary Examiner

T. A. GRANGER, Assistant Examiner

PO-1050
(5/69)

UNITED STATES PATENT OFFICE
CERTIFICATE OF CORRECTION

Patent No. 3,491,884            Dated January 27, 1970

Inventor(s) William H. Baker

It is certified that error appears in the above-identified patent and that said Letters Patent are hereby corrected as shown below:

Column 1, lines 16 and 32, "unidirection" should be
-- unidirectional --; Column 2, line 48, "saparation" should be
-- separation --; Column 7, line 17, "si" should be -- is --;
Column 8, lines 56 and 57 (Claim 1) (two occurrences)
"influence" should be -- influent --.

SIGNED AND
SEALED

JUN 30 1970

(SEAL)
Attest:

Edward M. Fletcher, Jr.
Attesting Officer

WILLIAM E. SCHUYLER, JR.
Commissioner of Patents